United States Patent
Nishida (10) Patent No.: US 7,847,610 B2
(45) Date of Patent: Dec. 7, 2010

(54) SEMICONDUCTOR DEVICE, INFORMATION PROCESSING APPARATUS AND POWER SUPPLY VOLTAGE VARIATION SUPPRESSING METHOD

(75) Inventor: Yoshihiro Nishida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 12/194,911

(22) Filed: Aug. 20, 2008

(65) Prior Publication Data

US 2009/0058515 A1  Mar. 5, 2009

(30) Foreign Application Priority Data

Aug. 28, 2007  (JP) .............. 2007-221494

(51) Int. Cl.
 *H03K 3/02* (2006.01)
 *G05F 1/10* (2006.01)
(52) U.S. Cl. ...................... 327/198; 327/544
(58) Field of Classification Search ................. 327/198, 327/544; 323/282
 See application file for complete search history.

(56) References Cited

U.S. PATENT DOCUMENTS 5,412,333 A * 5/1995 Okunaga .................... 327/198
5,610,544 A * 3/1997 Aoki .......................... 327/198
5,883,532 A * 3/1999 Bowers ....................... 327/198
5,926,051 A * 7/1999 Furutani ...................... 327/198

FOREIGN PATENT DOCUMENTS

| JP | 2000-151380 | 5/2000 |
| JP | 2003-124795 | 4/2003 |
| JP | 2006-164098 | 6/2006 |

* cited by examiner

*Primary Examiner*—Bao Q Vu
*Assistant Examiner*—Jue Zhang
(74) *Attorney, Agent, or Firm*—Pillsbury Winthrop Shaw Pittman, LLP (57) ABSTRACT

According to one embodiment, a semiconductor device includes an internal circuit which is driven by a power supply voltage and is set in one of a first state and a second state in which an amount of current consumed by the internal circuit is greater than in the first state, and a wait control module. The wait control module detects that a state of the internal circuit has transitioned from the first state to the second state, and executes a wait control process of outputting an operation start instruction signal to the internal circuit after passing of a predetermined wait time from the detection of the transition of the state of the internal circuit from the first start to the second state.

14 Claims, 10 Drawing Sheets

SEMICONDUCTOR DEVICE, INFORMATION PROCESSING APPARATUS AND POWER SUPPLY VOLTAGE VARIATION SUPPRESSING METHOD

CROSS-REFERENCE TO RELATED APPLICATIONS

This application is based upon and claims the benefit of priority from Japanese Patent Application No. 2007-221494, filed Aug. 28, 2007, the entire contents of which are incorporated herein by reference.

BACKGROUND

1. Field

One embodiment of the invention relates to a semiconductor device which is driven by a power supply voltage that is supplied from outside, an information processing apparatus including the semiconductor device, and a power supply voltage variation suppressing method for suppressing a variation of the power supply voltage which is supplied to the semiconductor device.

2. Description of the Related Art

In recent years, higher integration density and higher performance have been promoted in semiconductor devices such as processors and various controllers. The processors and the controllers are used in personal computers or consumer electronic apparatuses.

A power supply voltage specification value in a conventional semiconductor device is, for example, 5V±10% (±500 mV), and a voltage margin (±500 mV) of this power supply voltage is relatively wide. However, in modern semiconductor devices, a decrease in power supply voltage has been promoted. Accordingly, there has recently been developed a semiconductor device having a power supply voltage specification value of, e.g. 1V±3% (±30 mV) or 1V±5% (±50 mV).

Power that is output from a power supply circuit is supplied to a semiconductor device via a power supply wiring line on a printed circuit board. In usual cases, in order to suppress a variation of a power supply voltage that is supplied to the semiconductor device, a measure has been taken to connect a capacitor (bypass capacitor) to the power supply wiring line.

However, in order to limit the variation in power supply voltage, which is supplied to the semiconductor device, within a narrow tolerable range of ±30 mV or ±50 mV, the above-described measure of connecting the bypass capacitor is inadequate in some cases. In particular, in the case where the variation of load current of the semiconductor device is large, the variation of the power supply voltage also increases due to, e.g. a resistor component and an inductor component, which are included in the power supply wiring line on the printed circuit board, and it may be possible that the variation in power supply voltage, which is supplied to the semiconductor device, cannot be limited within the tolerable range of ±30 mV or ±50 mV.

Jpn. Pat. Appln. KOKAI Publication No. 2003-124795 discloses a semiconductor integrated circuit having a function of holding the value of a power supply current at a fixed value. This semiconductor integrated circuit includes a load current detection unit and a dummy current path. The value of a current (dummy current) flowing via the dummy current path is controlled in accordance with the value of a load current which is detected by the load current detection unit. Thereby, the value of power supply current which is consumed by the semiconductor integrated circuit, that is, the value of the sum of the load current and dummy current, is kept at a constant value.

In the semiconductor integrated circuit of Jpn. Pat. Appln. KOKAI Publication No. 2003-124795, however, since useless current (dummy current) is consumed by the dummy current path, the power consumption of the semiconductor integrated circuit is uselessly increased.

Therefore, it is necessary to realize a novel function which can suppress a variation in power supply voltage, without causing an increase in useless power consumption.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a semiconductor device which is driven by a power supply voltage which is supplied from outside, including: an internal circuit which is driven by the power supply voltage and is set in one of a first state and a second state in which an amount of current consumed by the internal circuit is greater than in the first state; and a wait control module configured to detect that a state of the internal circuit has transitioned from the first state to the second state, and execute a wait control process of outputting an operation start instruction signal to the internal circuit after passing of a predetermined wait time from the detection of the transition of the state of the internal circuit from the first start to the second state, thereby to cause the internal circuit to wait for a start of an operation which is to be executed in the second state, until a variation of the power supply voltage, which occurs at a time of the transition from the first state to the second state, is suppressed.

Figure 1:
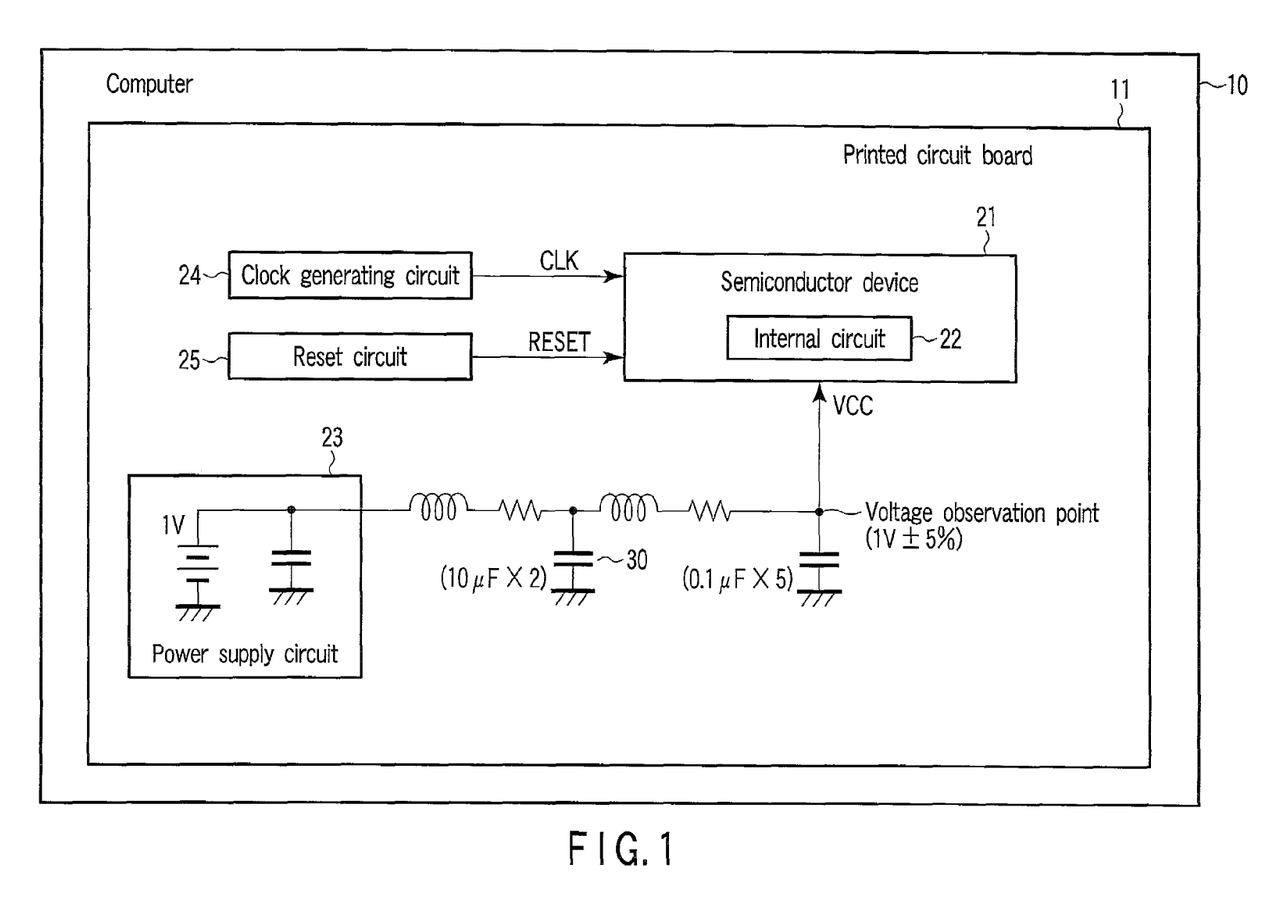
FIG. 1 is an exemplary block diagram showing a structure of an information processing apparatus which includes a semiconductor device according to an embodiment of the present invention.

To begin with, referring to FIG. 1, a description is given of the structure of an information processing apparatus which includes a semiconductor device according to an embodiment of the present invention. This information processing apparatus is realized, for example, as a notebook-type portable personal computer 10.

A printed circuit board 11 is provided in the main body of the personal computer 10. A semiconductor device 21, a power supply circuit 23, a clock generating circuit 24 and a reset circuit 25 are provided on the printed circuit board 11.

The semiconductor device 21 is a device which functions, for example, as a processor (CPU), and is driven by a power supply voltage VCC which is output from the power supply circuit 23. Specifically, an output of the power supply circuit 23 is connected to a power supply pin of the semiconductor device 21 via a power supply wiring line on the printed circuit board 11. The power supply wiring line includes a parasitic inductor component and a parasitic resistor component. For example, a capacitor (bypass capacitor) for suppressing a variation in power supply voltage VCC is connected to the power supply wiring line. FIG. 1 shows, by way of example, a case in which two bypass capacitors of 10 μF are connected to the power supply wiring line.

The semiconductor device 21 includes an internal circuit 22 which is driven by the power supply voltage VCC. The internal circuit 22 is a core logic of the semiconductor device 21 and includes many logics (many flip-flops, many logic gates, etc.). Each of these many logics is realized by, e.g. a CMOS circuit. The internal circuit 22 has a plurality of states, such as an off state, a standby state and a working state, between which the amount of electric current (load current) consumed by the internal circuit 22 is different. The internal circuit 22 is set in one of the plural states in accordance with a state control signal which is supplied from outside of the semiconductor device 21, or an event which occurs in the internal circuit 22.

When the state of the semiconductor device 21 is changed, there occurs a load current variation which is several times greater than a load current variation at a time of a normal operation of the semiconductor device 21. Accordingly, at the time of the state change, a variation of the power supply voltage VCC also increases due to this load current variation.

The clock generating circuit 24 outputs a clock signal (CLK). The clock signal (CLK) is supplied to a clock input pin of the semiconductor device 21. The reset circuit 25 outputs a reset signal (RESET) for setting the semiconductor device 21 in a reset state, or for canceling the reset state of the semiconductor device 21. This reset signal (RESET) is supplied to a reset input pin of the semiconductor device 21.

The power supply voltage specification value of the semiconductor device 21 is, for example, 1V±5% (±50 mV). In this case, it is necessary to limit the variation of the power supply voltage VCC, which is supplied to the power supply pin of the semiconductor device 21, within the range of 950 mV to 1050 mV.

The power supply circuit 23 outputs the power supply voltage VCC of, e.g. 1V. If the precision of the power supply circuit 23 is ±1.4% (±14 mV: 28 mV), in order to meet the power supply voltage specification value of the semiconductor device 21, it is necessary to suppress the variation of the power supply voltage, which is caused by the variation of the load current of the semiconductor device 21, within the range of ±3.6% (±36 mV: 72 mV).

As has been described above, in the semiconductor device 21 having a plurality of states, the variation of the power supply voltage VCC due to the variation of the load current of the semiconductor device 21 takes a maximum level when the state of the semiconductor device 21 is changed. Thus, in the present embodiment, the semiconductor device 21 includes a circuit for suppressing the variation of the power supply voltage at the time of state change. The details of this circuit will be described with reference to FIG. 3 and the following Figures.

Further, a memory and various I/O devices are provided on the printed circuit board 11.

Figure 2:
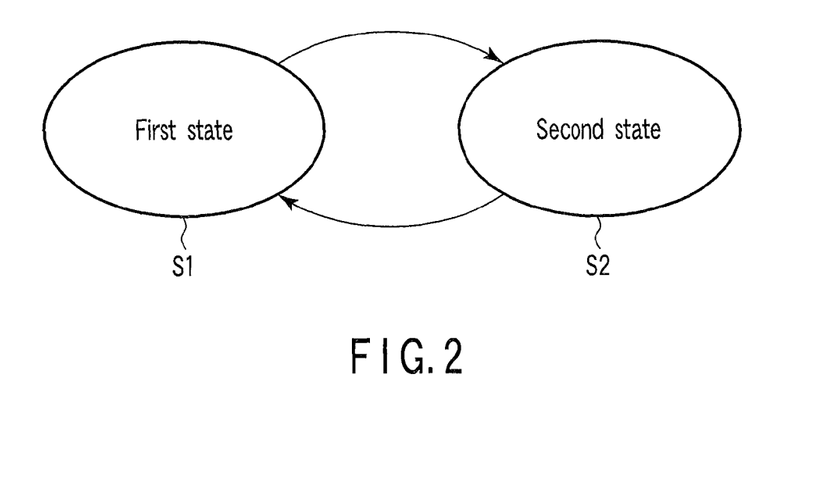
FIG. 2 is an exemplary view for explaining two states of the semiconductor device according to the present embodiment.

Next, referring to FIG. 2, the plural states, which the internal circuit 22 has, are described.

As shown in FIG. 2, the internal circuit 22 has at least two states, namely, a first state S1 and a second state S2. The internal circuit 22 is set in one of the first state S1 and second state S2.

The amount of current, which is consumed by the internal circuit 22 in the second state S2, is greater than the amount of current, which is consumed by the internal circuit 22 in the first state S1. In other words, the first state S1 is a state in which the power consumed by the internal circuit 22 is relatively small. The second state S2 is a state in which the power consumed by the internal circuit 22 is relatively large. Examples of the combination of the first state S1 and second state S2 are as follows:

(1) First state S1=inactive state; second state S2=active state, and (2) First state S1=low-power operation state; second state S2=high-power operation state.

Specifically, the first state S1 is a state in which the power supply voltage VCC is supplied to the internal circuit 22, and in which the internal circuit 22 is inactive. While the internal circuit 22 is in the inactive state, the internal circuit 22 does not operate.

The internal circuit 22 is set in the inactive state, for example, by the supply of a reset signal RESET, which is in an active state, to the internal circuit 22. Even if the power supply voltage VCC is supplied to the internal circuit 22, while the reset signal RESET is in the active state, the internal circuit 22 is kept in the reset state and the operation of the internal circuit 22 is stopped. The second state S2 is a state in which the power supply voltage VCC is supplied to the internal circuit 22, and the internal circuit 22 is in the active state.

When the reset signal RESET has transitioned from the active state to the inactive state, the reset state of the internal circuit 22 is canceled, and the internal circuit 22 transitions from the first state S1 (inactive state) to the second state S2 (active state) At this time, an electric current begins to flow to many logics in the internal circuit 22 at the same time, and thereby a load current greatly varies. Owing to the variation of the load current, a variation of the power supply voltage VCC occurs.

Normally, the operation of the internal circuit 22 is started immediately after the state change to the second state S2

(active state). Accordingly, immediately after the state change to the second state S2 (active state), a variation of the power supply voltage VCC due to the operation of the internal circuit 22 (the operation of the internal circuit 22 in the second state S2) is added to the variation of the power supply voltage VCC due to the state change. As a result, the variation of the power supply voltage VCC increases, and it is possible that the variation of the power supply voltage VCC cannot be limited within the above-mentioned range of ±3.6% (±36 mV).

Also when the state of the internal circuit 22 transitions from the second state S2 (active state) to the first state S1 (inactive state), the load current of the internal circuit 22 sharply decreases, thereby causing a variation in the power supply voltage VCC.

In addition, the internal circuit 22 is set in the inactive state, for example, by the stop of the supply of the clock signal CLK to the internal circuit 22. When the supply of the clock signal CLK to the internal circuit 22 is started, the state of the internal circuit 22 transitions from the first state S1 (inactive state) to the second state S2 (active state). At this time, too, an electric current begins to flow to many logics in the internal circuit 22 at the same time, and thereby the load current greatly varies. Owing to the load current, a variation of the power supply voltage VCC occurs.

The low-power operation state is, for example, a state in which only a part of a plurality of circuit blocks, which are provided in the internal circuit 22, operates. The high-power operation state is a state in which a greater number of circuit blocks operate than in the low-power operation state. For example, in a case where the internal circuit 22 comprises two circuit blocks, the clock signal CLK is supplied to only one of the two circuit blocks in the low-power operation state, and the supply of the clock signal CLK to the other circuit block is stopped. When the supply of the clock signal CLK to the other circuit block is started, the state of the internal circuit 22 transitions from the first state S1 (low-power operation state), in which only one of the circuit blocks operates, to the second state S2 (high-power operation state) in which both the one circuit block and the other circuit block operate (high-power operation state). At this time, an electric current flows to the other circuit block, and the load current of the internal circuit 22 sharply increases, thereby causing a variation in the power supply voltage VCC. Immediately after the state change to the second state S2 (high-power operation state), a variation of the power supply voltage VCC due to the normal operation of the internal circuit 22 (the operation of the internal circuit 22 in the second state S2) is added to the variation of the power supply voltage VCC due to the state change. As a result, the variation of the power supply voltage VCC increases, and it is possible that the variation of the power supply voltage VCC cannot be limited within the above-mentioned range of ±3.6% (±36 mV).

Also when the state of the internal circuit 22 transitions from the high-power operation state to the low-power operation state, the load current of the internal circuit 22 sharply decreases, thereby causing a variation in the power supply voltage VCC.

Figure 3:
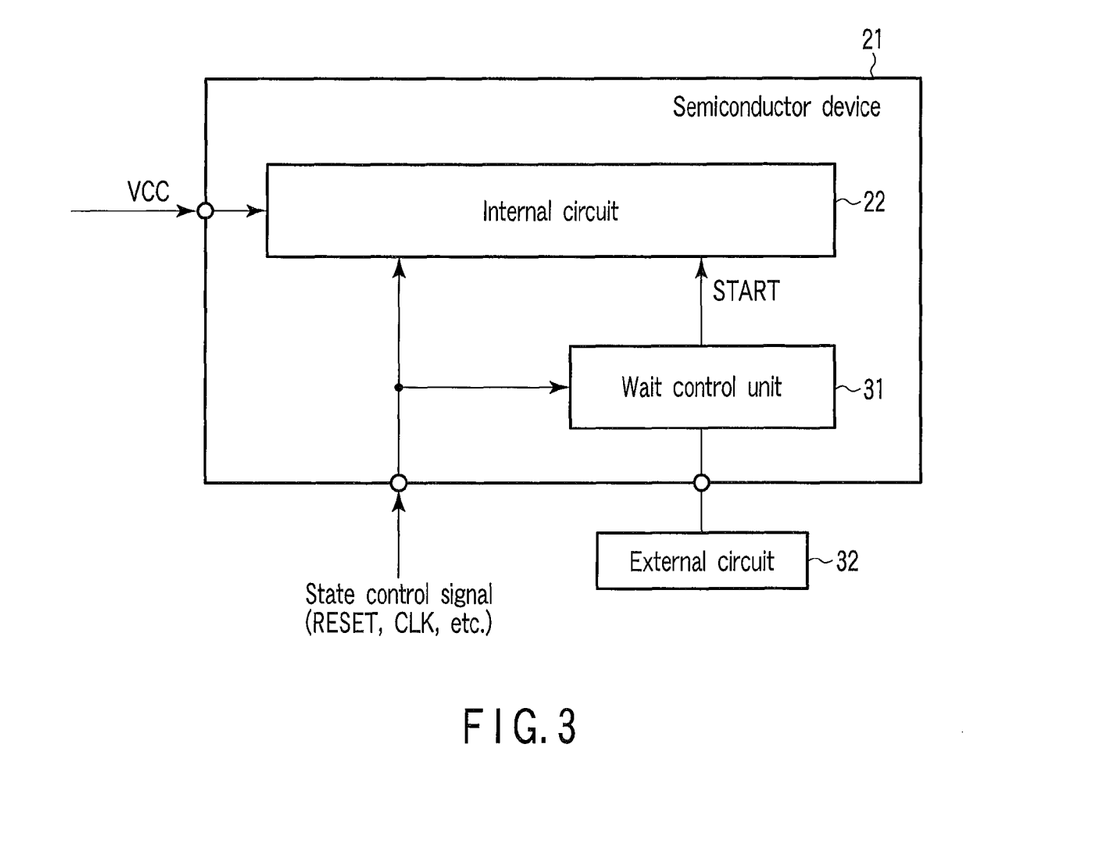
FIG. 3 is an exemplary block diagram showing an example of the structure of the semiconductor device according to the embodiment.

FIG. 3 shows an example of the structure of the semiconductor device 21.

The semiconductor device 21 includes a wait control unit 31 in order to suppress a variation of the power supply voltage VCC immediately after the state change of the internal circuit 22. The wait control unit 31 is a circuit module provided in the semiconductor device 21.

The wait control unit 31 detects that the state of the internal circuit 22 has transitioned from the first state S1 to the second state S2, in accordance with a state control signal (e.g. a reset signal or a clock signal) which is supplied from the outside of the semiconductor device 21. For example, responding to the change of the state of the reset signal from the active state to the inactive state, the wait control unit 31 detects that the state of the internal circuit 22 has transitioned from the first state S1 to the second state S2. In addition, in the case where the first state S1 is the state in which the internal circuit 22 is kept in the inactive state by the non-supply of the clock signal CLK to the internal circuit 22, the wait control unit 31 detects the start of the supply of the clock signal CLK to the internal circuit 22, thereby to detect the transition of the internal circuit 22 from the first state S1 to the second state S2.

When the internal circuit 22 has transitioned from the first state S1 to the second state S2, the wait control unit 31 outputs an operation start instruction signal START to the internal circuit 22 after the passing of a predetermined wait time from the detection of the transition of the state of the internal circuit 22 from the first start S1 to the second state S2, thereby to cause the internal circuit 22 to wait for a start of an operation that is to be executed in the second state S2, until a variation of the power supply voltage VCC, which occurs due to the transition from the first state S1 to the second state S2, is suppressed. The operation start instruction signal START is a signal (e.g. a command) for instructing the internal circuit 22 to start the operation. The internal circuit 22 does not start a normal operation until receiving the operation start instruction signal START.

The value of the wait time is preset on the basis of a time that is taken from the change of the state until the variation of the power supply voltage VCC due to the state change is suppressed and the power supply voltage VCC is stabilized. Immediately after the state change to the second state S2, a variation occurs in the power supply voltage VCC due to the state change, but the internal circuit 22 does not start the operation until the power supply voltage VCC is stabilized. It is thus possible to prevent the occurrence of such a situation that a variation of the power supply voltage VCC due to the operation of the internal circuit 22 is added to the variation of the power supply voltage VCC due to the state change. As a result, the amount of variation of the power supply voltage VCC immediately after the state change can be suppressed to a small amount.

The internal circuit 22 is in a kind of ready state during a time period from the transition of the internal circuit 22 to the second state S2 to the start of the operation by the internal circuit 22. If the internal circuit 22 in the ready state receives the operation start instruction signal START, the internal circuit 22 transitions from the ready state to a running state for executing the operation.

The time that is needed from the occurrence of the state change to the stabilization of the power supply voltage VCC varies depending on, for example, the amount of variation in load current due to the state change, parasitic inductance of the power supply wiring line on the printed circuit board 11, and the capacitance and number of bypass capacitors which are connected to the power supply wiring line. It is thus preferable to conduct a test for observing the amount of variation of the power supply voltage VCC after the fabrication of the computer 10, and to adjust the value of the wait time on the basis of the test result. The variation of the power supply voltage VCC, which is supplied to the semiconductor device 21, can be observed by detecting the voltage at a point which is indicated as "voltage observation point" in FIG. 1. In this case, it is preferable to connect about five capacitors of 0.1 µF in parallel at the "voltage observation point".

In the structure shown in FIG. 3, the value of the wait time is variably set by an external circuit 32 which is connected to the semiconductor device 21. The external circuit 32 is composed of an element such as a capacitor or a resistor. Accordingly, the value of the wait time can be adjusted, for example, by varying the capacitance of the capacitor in the external circuit 32 that is connected to the semiconductor device 21.

Further, the wait control unit 31 also detects that the state of the internal circuit 22 has transitioned from the second state S2 to the first state S1, in accordance with the state control signal that is supplied from the outside of the semiconductor device 21. The wait control unit 31 outputs the operation start instruction signal START to the internal circuit 22 after the passing of a predetermined wait time from the detection of the transition of the state of the internal circuit 22 from the second start S2 to the first state S1, thereby to cause the internal circuit 22 to wait for a start of an operation that is to be executed in the first state S1, until a variation of the power supply voltage VCC, which occurs at a time of the transition from the second state S2 to the first state S1, is suppressed. Thereby, also at the time of the state change from, for example, the high-power operation state to the low-power operation state, the variation of the power supply voltage VCC can be suppressed.

Figure 4:
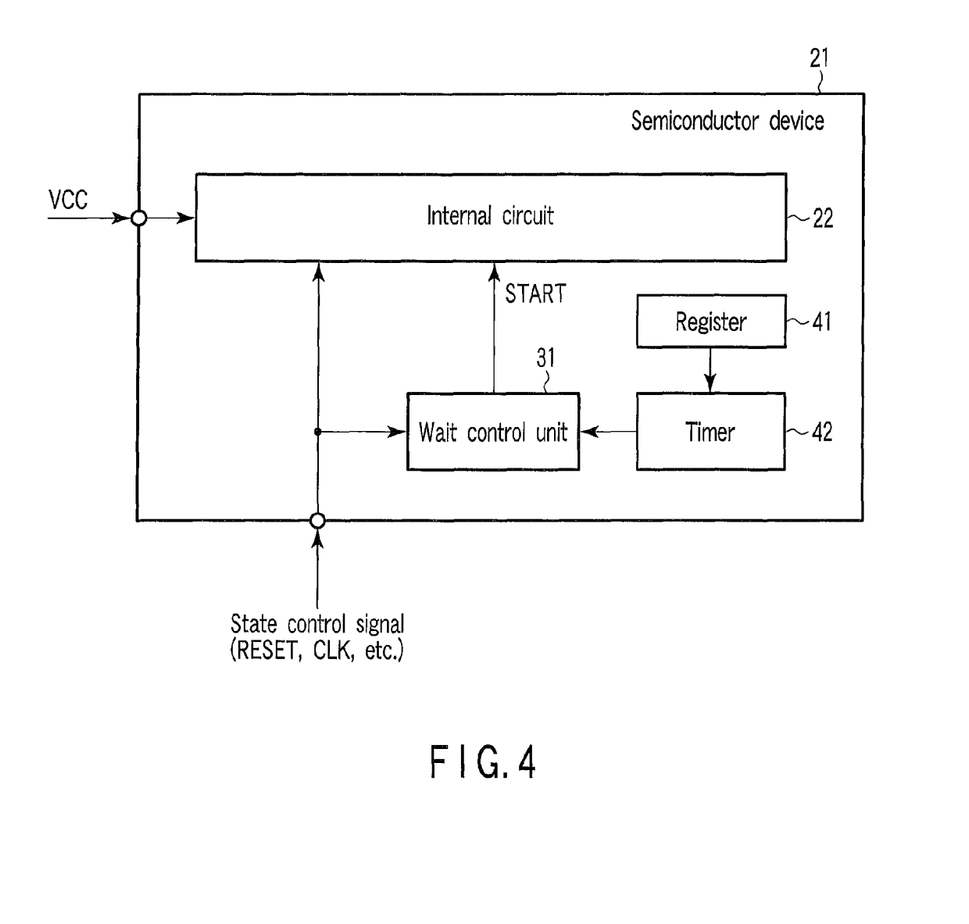
FIG. 4 is an exemplary block diagram showing another example of the structure of the semiconductor device according to the embodiment.

FIG. 4 shows another example of the structure of the semiconductor device 21.

In the semiconductor device 21 shown in FIG. 4, the value of the wait time by the above-described wait control unit 31 is adjusted not by the external circuit 32, but by a register 41 and a timer 42 which are provided in the semiconductor device 21. Specifically, the wait control unit 31 outputs the operation start instruction signal START to the internal circuit 22 after the passing of a wait time, which is indicated a value stored in the register 41, from the detection of the transition of the state of the internal circuit 22 from the first state S1 to the second start S2. Whether the wait time indicated by the value stored in the register 41 has passed or not can be detected by the timer 42. The register 41 is configured to be programmable, and the value stored in the register 41 can be varied. The value of the wait time can variably be set in accordance with the value stored in the register 41.

Figure 5:
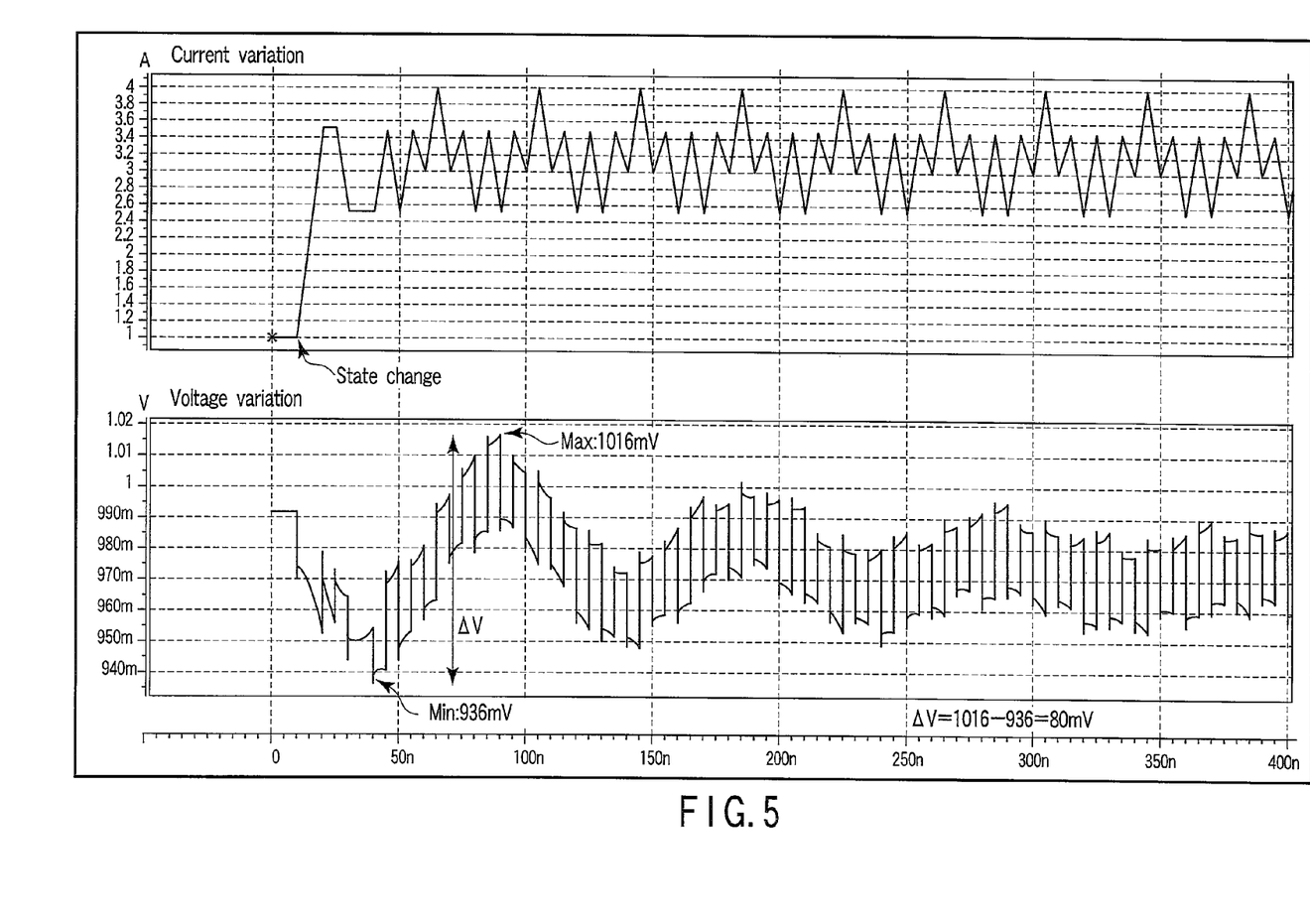
FIG. 5 is an exemplary view for explaining current/voltage variations, which occur at a time of state change.

FIG. 5 shows variations of the load current and the power supply voltage VCC immediately after the state change from the first state S1 to the second state S2. FIG. 5 corresponds to a case where the wait control unit 31 is not provided in the semiconductor device 21.

Assume now that the first state S1 is the above-described inactive state, and the second state S2 is the above-described active state.

In the case where the internal circuit 22 is in the first state S1, for example, (1) in the case where the power supply voltage VCC is supplied to the internal circuit 22 and the internal circuit 22 is reset, or (2) in the case where the power supply voltage VCC is supplied to the internal circuit 22 and the clock signal CLK is not supplied to the internal circuit 22, a load current (e.g. leak current) of, e.g. about 1 A flows in the internal circuit 22. When the reset signal RESET transitions from the active state to the inactive state and thereby the reset of the internal circuit 22 is canceled, or when the supply of the clock signal CLK to the internal circuit 22 is started, the state of the internal circuit 22 transitions from the first state S1 to the second state S2. At the time of this state change, an electric current flows to many logics in the internal circuit 22 at the same time. As a result, the value of the load current, which is consumed by the internal circuit 22, sharply increases from 1 A to, e.g. about 3.5 A, and then sharply falls to about 2.5 A. Since the power supply wiring line includes an inductor component, as described above, a variation of the power supply voltage VCC (ringing of VCC) occurs due to the large variation in the load current. Immediately after the state change to the second state S2, the internal circuit 22 starts a normal operation. Accordingly, since the variation of the power supply voltage due to the normal operation of the internal circuit 22 is added to the variation of the power supply voltage VCC due to the state change, the variation of the power supply voltage VCC is very large immediately after the state change. As a result, as shown in FIG. 5, for example, the maximum value Max of the power supply voltage VCC is 1016 mV, the minimum value Min of the power supply voltage VCC is 936 mV, and the maximum variation amount $\Delta V$ (=Max−Min) is 80 mV.

As has been described above, in order to meet the power supply voltage specification value of the semiconductor device 21, it is necessary to suppress the variation of the power supply voltage, which is caused by the variation of the load current, within the range of ±3.6% (±36 mV: 72 mV). The above-mentioned maximum variation amount $\Delta V$=80 mV exceeds the tolerable variation range of 72 mV by 4 mV.

Figure 6:
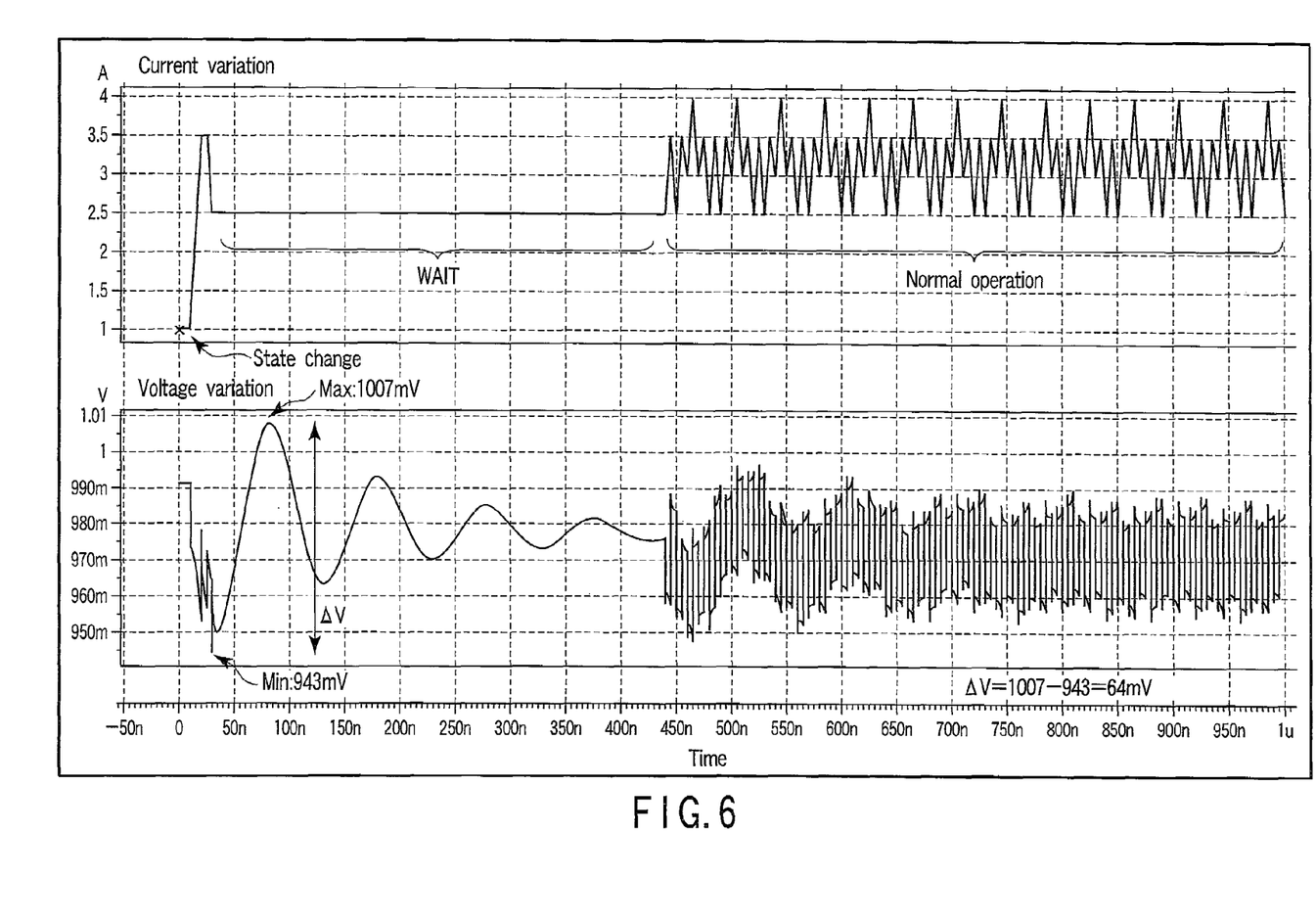
FIG. 6 is an exemplary view for explaining current/voltage variations, which occur when the state of the semiconductor device according to the embodiment changes from a first state to a second state.

FIG. 6 shows variations of the load current and the power supply voltage VCC immediately after the state change from the first state S1 to the second state S2 of the semiconductor device 21 which includes the wait control unit 31.

In the case where the internal circuit 22 is in the first state S1, for example, (1) in the case where the power supply voltage VCC is supplied to the internal circuit 22 and the internal circuit 22 is reset, or (2) in the case where the power supply voltage VCC is supplied to the internal circuit 22 and the clock signal CLK is not supplied to the internal circuit 22, a load current of, e.g. about 1 A flows in the internal circuit 22. When the reset signal RESET transitions from the active state to the inactive state and thereby the reset of the internal circuit 22 is canceled, or when the supply of the clock signal CLK to the internal circuit 22 is started, the state of the internal circuit 22 transitions from the first state S1 to the second state S2. At this time, an electric current flows to many logics in the internal circuit 22 at the same time. As a result, the value of the load current, which is consumed by the internal circuit 22, sharply increases from 1 A to, e.g. about 3.5 A, and then sharply falls to about 2.5 A. A variation of the power supply voltage VCC (ringing of VCC) occurs due to the large variation in the load current.

Until the power supply voltage VCC is stabilized, the start of the normal operation of the internal circuit 22 is awaited by the control of the wait control unit 31. Specifically, during the period until a wait time WAIT has passed since the occurrence of the state change, the internal circuit 22 is kept in the ready state and the internal circuit 22 does not start the normal operation. Accordingly, the during the wait time WAIT, the load current is kept at a fixed value (about 2.5 A). As a result, it is possible to prevent the occurrence of the situation that the variation of the power supply voltage VCC due to the normal operation of the internal circuit 22 is added to the variation of the power supply voltage VCC due to the state change, and it is thus possible to suppress to a small level the variation amount of the power supply voltage VCC immediately after the state change. In FIG. 6, the maximum value Max of the power supply voltage VCC is 1007 mV, the minimum value Min of the power supply voltage VCC is 943 mV, and the maximum variation amount $\Delta V$ (=Max−Min) of the power supply voltage VCC is 64 mV. The maximum variation amount $\Delta V$=64 mV falls within the tolerable variation range (=72 mV).

Figure 7:
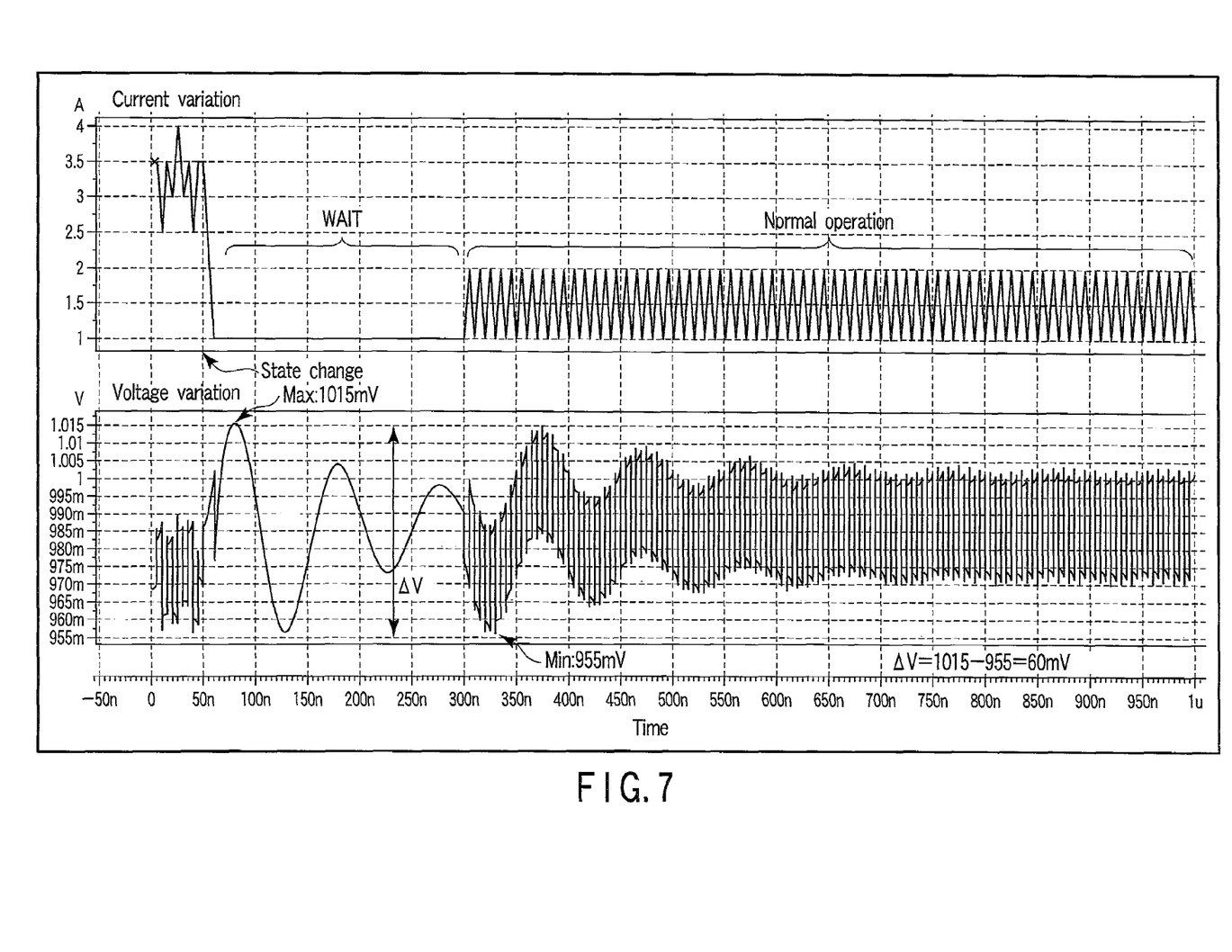
FIG. 7 is an exemplary view for explaining current/voltage variations, which occur when the state of the semiconductor device according to the embodiment changes from the second state to the first state.

FIG. 7 shows variations of the load current and the power supply voltage VCC immediately after the state change from the second state S2 to the first state S1 of the semiconductor device 21 which includes the wait control unit 31.

Assume now that the second state S2 is the above-described high-power operation state and the first state S1 is the above-described low-power operation state.

When the state of the internal circuit 22 transitions from the second state S2 to the first state S1, the load current of the internal circuit 22 sharply falls to about 1 A, and a variation of the power supply voltage VCC (ringing of VCC) occurs.

Until the power supply voltage VCC is stabilized, the start of the normal operation of the internal circuit 22 in the first state S1 is awaited by the control of the wait control unit 31. Specifically, during the period until a wait time WAIT has passed since the occurrence of the state change, the internal circuit 22 does not start the normal operation, and accordingly the load current is kept at a fixed value (about 1 A). As a result, it is possible to prevent the occurrence of the situation that the variation of the power supply voltage due to the normal operation of the internal circuit 22 is added to the variation of the power supply voltage VCC due to the state change, and it is thus possible to suppress to a small level the variation amount of the power supply voltage VCC immediately after the state change. In FIG. 7, the maximum value Max of the power supply voltage VCC is 1015 mV, the minimum value Min of the power supply voltage VCC is 955 mV, and the maximum variation amount $\Delta V$ (=Max−Min) of the power supply voltage VCC is 60 mV. This maximum variation amount $\Delta V$=60 mV falls within the tolerable variation range (=72 mV).

Figure 8:
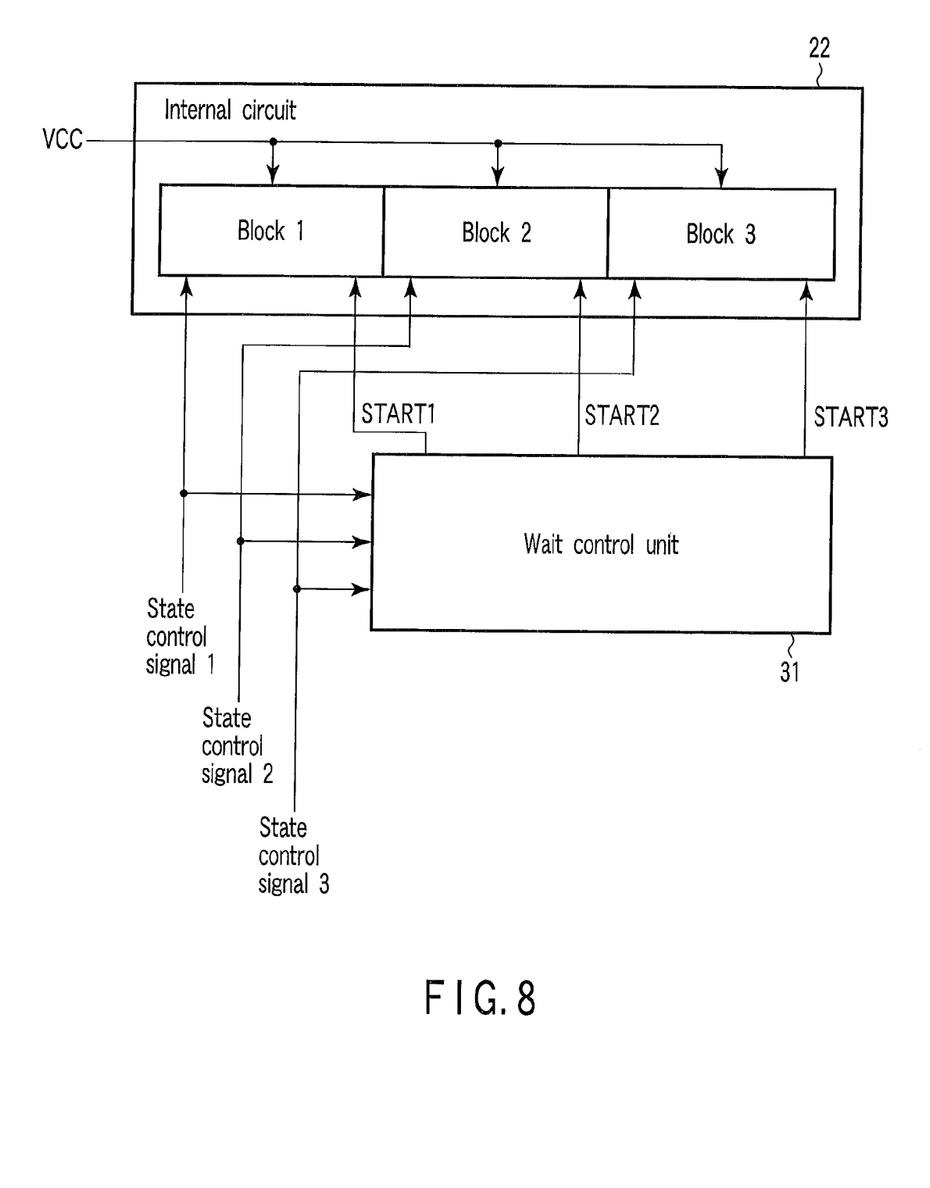
FIG. 8 is an exemplary block diagram showing still another example of the structure of the semiconductor device according to the embodiment.

FIG. 8 shows an example of the structure of the wait control unit 31, which corresponds to a case in which the internal circuit 22 is divided into a plurality of blocks.

As shown in FIG. 8, the internal circuit 22 is composed of a plurality of blocks, for example, three blocks (blocks 1, 2 and 3). These blocks are driven by the power supply voltage VCC. Each of the blocks has a first state S1 (e.g. inactive state) and a second state S2 (e.g. active state), and is set in one of the first state S1 and second state S2 in accordance with a state control signal (e.g. a reset signal or a clock signal) which is supplied from the outside of the semiconductor device 21. For example, the state of the block 1 is changed between the first state S1 and second state S2 by a state control signal 1, the state of the block 2 is changed between the first state S1 and second state S2 by a state control signal 2, and the state of the block 3 is changed between the first state S1 and second state S2 by a state control signal 3.

The wait control unit 31 detects one of the plural blocks 1, 2 and 3, which has transitioned from the first state S1 to the second state S2, in accordance with the state control signals 1, 2 and 3. The wait control unit 31 executes, for the detected block, a wait control process for causing the detected block to wait for the start of the operation of the detected block until the power supply voltage VCC is stabilized.

Specifically, if the block 1 has transitioned from the first state S1 to the second state S2, the wait control unit 31 outputs an operation start instruction signal START1 to the block 1 after the passing of a predetermined wait time from the detection of the state change of the block 1 from the first state S1 to the second state S2, thereby to cause the block 1 to wait for the start of the operation of the block 1 until the variation of the power supply voltage VCC is suppressed.

If the block 2 has transitioned from the first state S1 to the second state S2, the wait control unit 31 outputs an operation start instruction signal START2 to the block 2 after the passing of a predetermined wait time from the detection of the state change of the block 2 from the first state S1 to the second state S2, thereby to cause the block 2 to wait for the start of the operation of the block 2 until the variation of the power supply voltage VCC is suppressed.

If the block 3 has transitioned from the first state S1 to the second state S2, the wait control unit 31 outputs an operation start instruction signal START3 to the block 3 after the passing of a predetermined wait time from the detection of the state change of the block 3 from the first state S1 to the second state S2, thereby to cause the block 3 to wait for the start of the operation of the block 3 until the variation of the power supply voltage VCC is suppressed.

As described above, in the case where the internal circuit 22 is composed of a plurality of blocks, the wait control process by the wait control unit 31 is executed selectively for each of the blocks.

With the structure shown in FIG. 8, for example, when the semiconductor device 21 is activated, it is possible to execute such control that the entirety of the internal circuit 22 is not transitioned from the first state S1 to the second state S2, but the blocks 1, 2 and 3 are successively transitioned from the first state S1 to the second state S2.

Specifically, when the semiconductor device 21 is activated, the blocks 1, 2 and 3 are successively transitioned from the first state S1 to the second state S2 with predetermined time intervals. Thereby, compared to the case in which the states of the blocks 1, 2 and 3 are transitioned at the same time, the variation amount of the power supply voltage VCC can be decreased. Moreover, the start of the normal operation of the block, the state of which has been changed, is awaited until the power supply voltage VCC is stabilized. Therefore, the variation amount of the power supply voltage VCC of the semiconductor device 21 can greatly be reduced.

Figure 9:
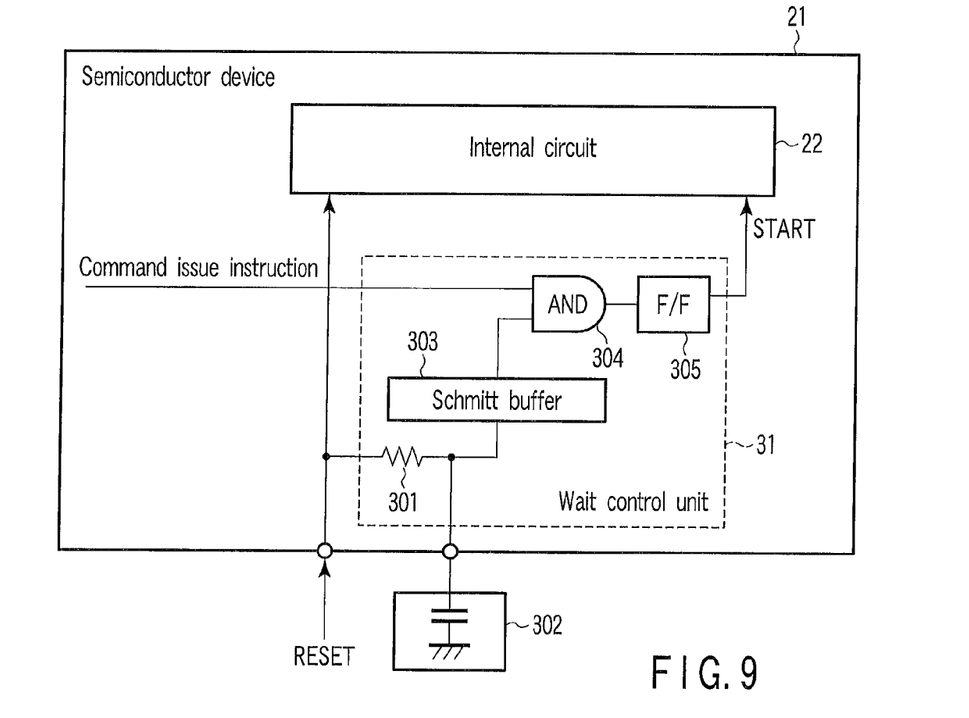
FIG. 9 is an exemplary block diagram showing an example of the structure of a wait control unit which is provided in the semiconductor device according to the embodiment.

Next, referring to FIG. 9, a specific example of the structure of the wait control unit 31 is described.

In FIG. 9, it is assumed that the first state S1 is an inactive state, the second state S2 is an active state, and the above-described state control signal for controlling the state transition is the reset signal RESET.

The wait control unit 31 includes a resistor 301; an external circuit 302 including a capacitor; a buffer (Schmitt buffer) 303; a 2-input AND gate 304; and a flip-flop (F/F) 305.

The resistor 301 is connected to a reset signal line. The resistor 301 is also connected to the capacitor of the external circuit 302 via a signal pin of the semiconductor device 21. A CR time constant circuit for delaying the reset signal RESET, which is input from outside, is composed of the resistor 301 and the capacitor of the external circuit 302. An output of the CR time constant circuit is connected to one of inputs of the 2-input AND gate 304 via the buffer (Schmitt buffer) 303. A command issue instruction is input to the other input of the 2-input AND gate 304. A command issue instruction is an instruction for instructing the internal circuit 22 to start an operation (a process corresponding to a command). As the command issue instruction, use may be made of, for instance, an instruction for instructing the internal circuit 22 to fetch an instruction from a memory which is provided on the printed circuit board 11, or a memory which is provided in the semiconductor device 21.

Figure 10:
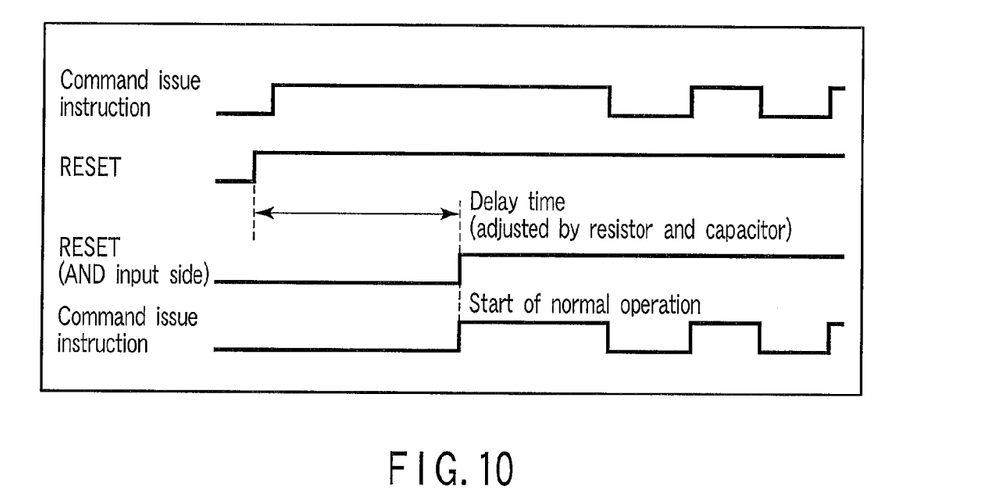
FIG. 10 is an exemplary timing chart illustrating the operation of the wait control unit shown in FIG. 9.

FIG. 10 is a timing chart showing an operation timing of the wait control unit 31 shown in FIG. 9.

A signal of logic "1" is input to the above-mentioned other input of the 2-input AND gate 304 after the passing of a predetermined delay time of the CR time constant circuit from the transition of the reset signal RESET from the active state (logic "0") to the inactive state (logic "1"). Thereby, the command issue instruction is sent to the flip-flop 305 via the 2-input AND gate 304, and the command issue instruction is supplied to the internal circuit 22 as the above-described operation start signal START. Responding to the reception of the operation start signal START, the internal circuit 22 starts the normal operation.

Figure 11:
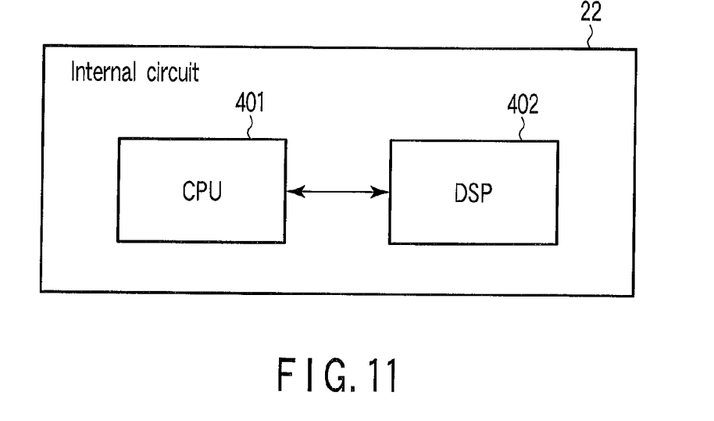
FIG. 11 is an exemplary block diagram showing an example of the structure of an internal circuit of the semiconductor device according to the embodiment.

FIG. 11 shows an example in which the internal circuit 22 is composed of a CPU and a DSP (Digital Signal Processor).

The internal circuit 22 comprises a CPU 401 and a DSP 402. The internal circuit 22 has three states, namely, a state (off state) in which both the CPU 401 and the DSP 402 are in the inactive state, a state (low-power state) in which only the CPU 401 operates, and a state (high-power state) in which both the CPU 401 and DSP 402 operate.

Figure 12:
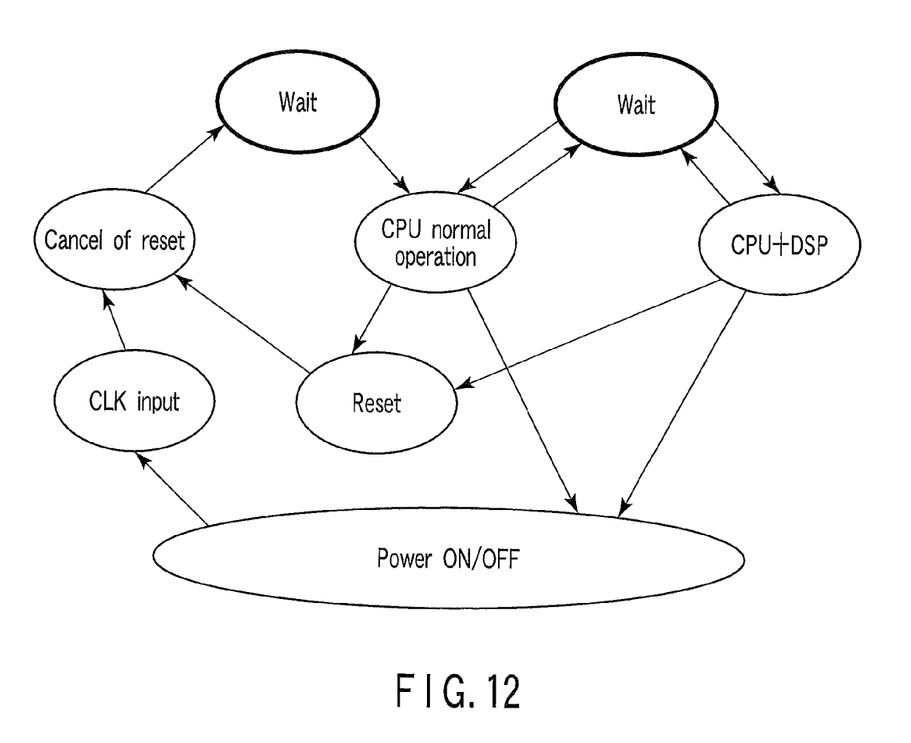
FIG. 12 is an exemplary view for describing the state transition of the internal circuit shown in FIG. 11.

FIG. 12 shows an example of the state transition of the internal circuit 22.

When the reset state of the CPU 401 is canceled, the CPU 401 transitions to the active state and starts the normal operation. In this case, by the wait control process (WAIT) that is executed by the wait control unit 31, the CPU 401 starts the normal operation after the passing of the predetermined wait time from the transition to the active state by the cancel of the reset state.

When the state (low-power state) in which the CPU 401 alone operates normally is changed to the state (high-power state) in which both the CPU 401 and DSP 402 operate, each of the CPU 401 and DSP 402 starts the normal operation after the passing of the predetermined wait time from the state change by the wait control process (WAIT) that is executed by the wait control unit 31. During the wait time period, each of the CPU 401 and DSP 402 does not execute the operation such as an instruction execution operation. In addition, when the high-power state is changed to the low-power state, the CPU 401 starts the normal operation after the passing of the predetermined wait time from the state change by the wait control process (WAIT) that is executed by the wait control unit 31, and the CPU 401 does not execute the operation, such as an instruction execution operation, during the wait time period.

Figure 13:
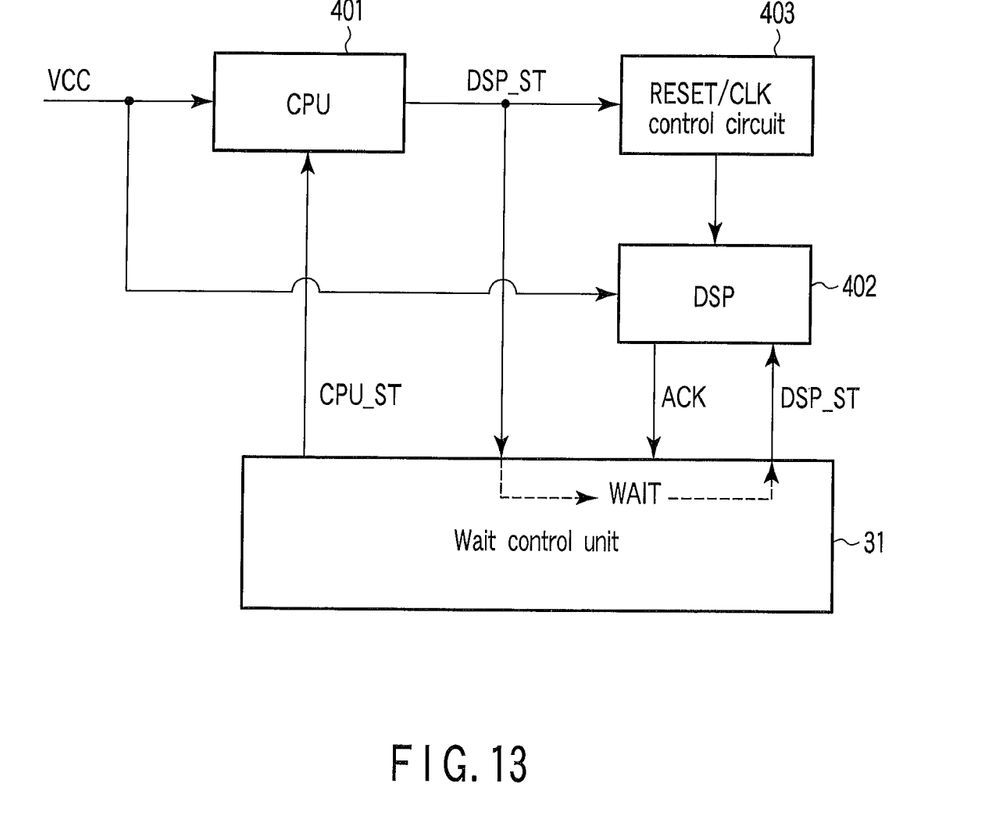
FIG. 13 is an exemplary block diagram showing another example of the structure of the wait control unit which is provided in the semiconductor device according to the embodiment.

Next, referring to FIG. 13, a description is given of the operation of the wait control unit 31, which is executed when the state (low-power state) in which the CPU 401 alone normally operates is changed to the state (high-power state) in which both the CPU 401 and DSP 402 operate.

In order to transition the state of the DSP 402 from the off state (inactive state) to the working state (active state), the CPU 401 outputs a signal DSP_ST which instructs the start of operation of the DSP 402. Then, the CPU 401 transitions to the inactive state and stops execution of the normal operation. Responding to the signal DSP_ST from the CPU 401, a reset/clock control circuit 403, which is provided in the semiconductor device 21, executes a process of starting the supply of the clock signal to the DSP 402, or a process of setting the reset signal, which is supplied to the DSP 402, in the inactive state and canceling the reset of the DSP 402. Thereby, the DSP 402 transitions from the inactive state to the active state.

The signal DSP_ST, which is output from the CPU 401, is also sent to the wait control unit 31. The wait control unit 31 can detect that the state of the DSP 402 has transitioned from the inactive state to the active state, in accordance with the signal DSP_ST from the CPU 401.

The wait control unit 31 outputs the signal DSP_ST, which instructs the operation start of the DSP 402, to the DSP 402 after the passing of a predetermined wait time from the detection of the state transition of the DSP 402 from the inactive state to the active state. Responding to the signal DSP_ST from the wait control unit 31, the DSP 402 sends an acknowledge signal ACK to the wait control unit 31, and starts the normal operation.

Responding to the reception of the acknowledge signal ACK from the DSP 402, the wait control unit 31 sends an operation start signal CPU_ST to the CPU 401 as an interrupt signal or the like, thereby causing the CPU 401 to start the normal operation.

With the structure of FIG. 13, too, the value of the wait time can be adjusted by the external circuit which is connected to the semiconductor device 21, or by varying the set value of the register in the semiconductor device 21.

As has been described above, in the present embodiment, consideration is given to the fact that when the state of the internal circuit 22 is changed, there occurs a load current variation which is several times greater than a load current variation at a time of a normal operation of the internal circuit 22. Taking this into account, when the state of the internal circuit 22 is changed, the process of causing the internal circuit 22 to wait for the start of operation until the power supply voltage VCC is stabilized is executed. As a result, it is possible to prevent the occurrence of the situation that the variation of the power supply voltage VCC due to the operation of the internal circuit 22 is added to the variation of the power supply voltage VCC due to the state change, and it is thus possible to suppress to a small level the variation amount of the power supply voltage VCC immediately after the state change.

Since the variation of the power supply voltage VCC can be suppressed without using such control that the load current is always kept constant by supplying a dummy current, a useless increase in power consumption can be prevented, and the power supply voltage VCC can be limited to the tolerable range that corresponds to the power supply voltage specification value.

The wait control unit 31 is applicable not only to the semiconductor device that functions as a processor, but also to, for instance, a semiconductor device functioning as an I/O device, a semiconductor device functioning as an I/O controller for controlling an I/O device, and a semiconductor device functioning as a bridge which connects buses.

In the case where the internal circuit 22 includes a CPU, the CPU may be configured to execute a count operation for detecting the passing of a predetermined wait time from the occurrence of a state change. Thereby, the operation of the internal circuit can be awaited by a wait time, without using the above-described timer 42 or CR time constant circuit.

While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A semiconductor device which is driven by a power supply voltage which is supplied from outside, comprising:
   an internal circuit which is driven by the power supply voltage and is set in one of a first state and a second state in which an amount of current consumed by the internal circuit is greater than in the first state; and
   a wait control module configured to detect that a state of the internal circuit has transitioned from the first state to the second state, and to execute a wait control process of outputting an operation start instruction signal to the internal circuit after passing of a predetermined wait time from the detection of the transition of the state of the internal circuit from the first start to the second state, thereby to cause the internal circuit to wait for a start of an operation which is to be executed in the second state, until a variation of the power supply voltage, which occurs at a time of the transition from the first state to the second state, is suppressed.

2. The semiconductor device according to claim 1, wherein the first state is a state in which the power supply voltage is supplied to the internal circuit and the internal circuit is in an inactive state by supply of a reset signal, which is in an active state, to the internal circuit from outside, and the second state is a state in which the power supply voltage is supplied to the internal circuit and the internal circuit is in an active state, and
the internal circuit transitions from the first state to the second state, in response to a change of the reset signal from the active state to an inactive state.

3. The semiconductor device according to claim 1, wherein the first state is a state in which the power supply voltage is supplied to the internal circuit, a clock signal is not supplied to the internal circuit and the internal circuit is in an inactive state, and the second state is a state in which the power supply voltage is supplied to the internal circuit and the internal circuit is in an active state, and
the internal circuit transitions from the first state to the second state, in response to a start of supply of the clock signal.

4. The semiconductor device according to claim 1, wherein a value of the wait time is variably set by an external circuit which is connected to the semiconductor device.

5. The semiconductor device according to claim 1, wherein the wait control module is configured to output the operation start instruction signal to the internal circuit after passing of the wait time, which is indicated a value stored in a register provided in the semiconductor device, from the detection of the transition of the state of the internal circuit from the first state to the second start.

6. The semiconductor device according to claim 5, wherein the register is configured to be programmable.

7. The semiconductor device according to claim 1, wherein the wait control module is configured to detect that the state of the internal circuit has transitioned from the second state to the first state, and to output the operation start instruction signal to the internal circuit after passing of a predetermined wait time from the detection of the transition of the state of the internal circuit from the second state to the first start, thereby to cause the internal circuit to wait for a start of an operation which is to be executed in the first state, until a variation of the power supply voltage, which occurs at a time of the transition from the second state to the first state, is suppressed.

8. The semiconductor device according to claim 1, wherein the internal circuit is divided into a plurality of blocks, and each of the blocks is configured to be set in one of the first state and the second state, and
the wait control module detects a block of the plurality of blocks, which has transitioned from the first state to the second state, and executes the wait control process for the detected block.

9. An information processing apparatus comprising:
a printed circuit board;
a power supply circuit which is provided on the printed circuit board;
a semiconductor device which is provided on the printed circuit board and is driven by a power supply voltage which is supplied from the power supply circuit, the semiconductor device including an internal circuit which is driven by the power supply voltage and is set in one of a first state and a second state in which an amount of current consumed by the internal circuit is greater than in the first state; and
a wait control module which is provided in the semiconductor device, detects that a state of the internal circuit has transitioned from the first state to the second state, and executes a wait control process of outputting an operation start instruction signal to the internal circuit after passing of a predetermined wait time from the detection of the transition of the state of the internal circuit from the first start to the second state, thereby to cause the internal circuit to wait for a start of an operation which is to be executed in the second state, until a variation of the power supply voltage, which occurs at a time of the transition from the first state to the second state, is suppressed.

10. The information processing apparatus according to claim 9, wherein the wait control module detects that the state of the internal circuit has transitioned from the second state to the first state, and outputs the operation start instruction signal to the internal circuit after passing of a predetermined wait time from the detection of the transition of the state of the internal circuit from the second state to the first start, thereby to cause the internal circuit to wait for a start of an operation which is to be executed in the first state, until a variation of the power supply voltage, which occurs at a time of the transition from the second state to the first state, is suppressed.

11. A power supply voltage variation suppressing method for suppressing a variation of a power supply voltage which is supplied to a semiconductor device, the semiconductor device including an internal circuit which is driven by the power supply voltage, the internal circuit being configured to be set in one of a first state and a second state in which an amount of current consumed by the internal circuit is greater than in the first state, the method comprising:
detecting that a state of the internal circuit has transitioned from the first state to the second state; and
executing, when it is detected that the state of the internal circuit has transitioned from the first state to the second state, a wait control process of outputting an operation start instruction signal to the internal circuit after passing of a predetermined wait time from the detection of the transition of the state of the internal circuit from the first start to the second state, thereby to cause the internal circuit to wait for a start of an operation which is to be executed in the second state, until a variation of the power supply voltage, which occurs at a time of the transition from the first state to the second state, is suppressed.

12. The power supply voltage variation suppressing method according to claim 11, wherein the first state is a state in which the power supply voltage is supplied to the internal circuit and the internal circuit is in an inactive state by supply of a reset signal, which is in an active state, to the internal circuit from outside, and the second state is a state in which the power supply voltage is supplied to the internal circuit and the internal circuit is in an active state, and the internal circuit is configured to transition from the first state to the second state in response to a change of the reset signal from the active state to an inactive state, and
said detecting includes detecting that the reset signal has transitioned from the active state to the inactive state, thereby to detect that the internal circuit has transitioned from the first state to the second state.

13. The power supply voltage variation suppressing method according to claim 11, wherein the first state is a state in which the power supply voltage is supplied to the internal circuit, a clock signal is not supplied to the internal circuit and the internal circuit is in an inactive state, and the second state is a state in which the power supply voltage is supplied to the internal circuit and the internal circuit is in an active state, and the internal circuit is configured to transition from the first state to the second state in response to a start of supply of the clock signal, and said detecting includes detecting the start of the supply of the clock signal, thereby to detect that the internal circuit has transitioned from the first state to the second state.

14. The power supply voltage variation suppressing method according to claim 11, further comprising:

detecting that the state of the internal circuit has transitioned from the second state to the first state; and outputting, when it is detected that the internal circuit has transitioned from the second state to the first state, the operation start instruction signal to the internal circuit after passing of a predetermined wait time from the detection of the transition of the state of the internal circuit from the second state to the first start, thereby to cause the internal circuit to wait for a start of an operation which is to be executed in the first state, until a variation of the power supply voltage, which occurs at a time of the transition from the second state to the first state, is suppressed.

* * * * *